United States Patent [19]

Kanda et al.

[11] 4,317,759
[45] Mar. 2, 1982

[54] STABILIZED AQUEOUS SOLUTIONS OF ACRYLAMIDE POLYMERS

[75] Inventors: Shoichi Kanda, Yokosuka; Toshikazu Oda, Yokohama; Yasunosuke Tanabe, Tokyo; Takeshi Arai, Urawa, all of Japan

[73] Assignees: Nitto Kagaku Kogyo Kabushiki Kaisha; Kawaguchi Kagaku Kogyo Kabushiki Kaisha, both of Japan

[21] Appl. No.: 241,527

[22] Filed: Mar. 9, 1981

[30] Foreign Application Priority Data

Mar. 21, 1980 [JP] Japan ................................. 55-34732

[51] Int. Cl.³ ............................................... C08L 0/00
[52] U.S. Cl. ..................................................... 524/93
[58] Field of Search ........................ 260/29.62, 45.8 N

[56] References Cited

U.S. PATENT DOCUMENTS

| | | | |
|---|---|---|---|
| 2,630,421 | 3/1953 | Stamatoff | 260/45.8 |
| 3,234,163 | 2/1966 | Schurz et al. | 260/29.6 |
| 3,235,523 | 2/1966 | Schurz et al. | 260/29.6 |
| 3,412,060 | 11/1968 | Sarem | 260/29.6 |
| 3,493,539 | 2/1970 | Skovltchi et al. | 260/47 |
| 3,753,939 | 8/1973 | Von Euler-Chelpin | 260/29.62 |

Primary Examiner—Joseph L. Schofer
Assistant Examiner—Bernard Lipman
Attorney, Agent, or Firm—Robert E. Burns; Emmanuel J. Lobato; Bruce L. Adams

[57] ABSTRACT

An aqueous acrylamide polymer solution is stabilized by causing it to contain in combination a 2-mercaptobenzimidazole compound and a phenolic antioxidant compound.

3 Claims, No Drawings

STABILIZED AQUEOUS SOLUTIONS OF ACRYLAMIDE POLYMERS

BACKGROUND OF THE INVENTION

1. Field of the Art

This invention relates to aqueous solutions of acrylamide polymers stabilized against degradation or decomposition.

Acrylamide polymers are being widely utilized in many industrial fields as, for example, sedimentation aids or flocculants, soil conditioners, agents for paper production, additives for electrolytic refining, agents for reducing frictional resistance, textile aids, oil-water separation agents, mobility control agents for enhanced oil recovery, and various binders. Moreover, each time there is a renovation in features such as the types and combinations of the modifications of these polymers, new uses therefor have been developed. Thus, acrylamide polymers are producing successful results in response to expectations on the point of broad use.

However, acrylamide polymers have a serious drawback, whereby the desirable characteristics and capacities inherently possessed by these polymers cannot be amply utilized in some cases. More specifically, acrylamide polymers undergo degradation or decomposition more readily than other polymers. For example, in cases wherein aqueous solutions of acrylamide polymers are left standing at room temperature, a phenomenon wherein the initial viscosity values of these solutions can be maintained for only a short time is frequently observed. This tendency of the performance of these polymers to deteriorate is accelerated particularly at relatively high temperatures, and, in extreme cases, use of polymers for their intended purposes becomes impossible.

Thus, the stabilization of aqueous solutions of acrylamide polymers is of great importance for the reduction to practical use of these polymers which are fundamentally of great value. As a result of the expansion of the fields of use of these polymers, high level of stabilization is being required. For example, an aqueous solution of an acrylamide polymer is used as one of the polymer-augmented waterflooding for enhanced oil recovery. In this case, reservoir temperature is approximately 40° to 100° C., and, moreover, the aqueous solution of the acrylamide polymer is injected for a long time of several months to several tens of months in the underground reservoir extending from the injection well to the production well. Accordingly, the user demands a guarantee for the quantity of the polymer during this period.

Therefore, the suppliers of such acrylamide polymers are faced with the problem of keeping as small as possible variations with time of the polymer quality in this temperature region. When this problem is solved, it will become possible for the first time to amply utilize the original functional worth of these polymers in this field.

2. Prior Art

Various studies have been and are being made for providing agents for preventing degradation of acrylamide polymers. For example, 2-(o-amidophenyl)-2,1,3-benzotriazole and 2-(2-hydroxyphenyl) benzotriazole are introduced as being effective UV absorbers in U.S. Pat. Nos. 3,337,356 and 3,493,539.

SUMMARY OF THE INVENTION

It is an object of this invention to provide a solution to the above described problem. This problem has been solved in accordance with this invention by using in combination two specific kinds of stabilizer compounds thereby to utilize their synergistic contributions.

According to this invention, briefly summarized, there is provided an aqueous solution of a stabilized acrylamide polymer containing in combination a 2-mercaptobenzimidazole compound and a phenol antioxidant compound.

The state herein referred to as "containing in combination" the two compounds is intended to include the case wherein one or both of the two compounds are caused to exist beforehand in the production process of the acrylamide polymer, that is the polymerization process, thereby to cause the compound(s) to be contained in the resulting polymer or the aqueous solution thereof.

As will be apparent from the specific examples of experiments set forth hereinafter, by the combined use of the two compounds, a stabilizing effectiveness greater than that when each compound is used singly, that is, a synergism, is obtained.

Furthermore, the stabilizing effect provided by this invention is obtained at not only room temperature but also at a temperature as high as 100° C.

The nature, utility, and further features of this invention will be more clearly apparent from the following detailed description beginning with a consideration of the general aspects of the invention and concluding with specific examples of practice thereof.

DETAILED DESCRIPTION OF THE INVENTION

1. Stabilizer

1-1. 2-mercaptobenzimidazole compound (A)

For the 2-mercaptobenzimidazole compound be used in this invention, a compound represented by the following formula or a tautomer thereof is suitable.

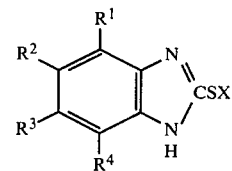

where each of $R^1$ through $R^4$ is a hydrogen atom or a lower alkyl group, particularly a methyl group or an ethyl group, and X is a hydrogen atom, an alkali metal, or ammonium.

Of these compounds of the formula, 2-mercaptobenzimidazole, each of $R^1$ through $R^4$ being H, X being H; methyl-2-mercaptobenzimidazoles, at least one of $R^1$ through $R^4$ being methyl, X being H; and sodium salts thereof, X being Na; are preferable.

1-2. Phenolic antioxidant compound (B)

The phenolic antioxidant compound used in this invention can be selected from those proposed for inhibiting of oxidation of various organic compounds. This phenolic antioxidant compound, in general, is an alkyl phenolic compound having a substituent exhibiting a steric hindrance effect such as, for example, a tertiary butyl group, at one or both ortho positions, that is a so-called hindered phenolic compound.

Specific examples of phenolic antioxidants suitable for use in this invention are: 2,2'-methylene bis-(4-lower alkyl (particularly methyl or ethyl)-6-tertiarybutyl-phenol); 4,4'-butylidene-bis(3-lower alkyl (particularly methyl or ethyl)-6-tertiarybutylphenol); 3,5-ditertiarybutyl-4-hydroxybenzyl alcohol; and lower alkylethers (particularly methyl or ethylethers) thereof.

1-3. Composition and quantities

While the ratio of the quantities of the two compounds (A) and (B) can be any value provided that the aforementioned synergistic effect is exhibited, a mol ratio (A)/(B) of the order of 0.1 to 20, particularly 0.2 to 5, is preferable, in general.

While the quantities in which the two compounds are used are not particularly restricted provided that the results of their use are observable, it is preferable, in general, that the total quantity of the two compounds used be of the order of 0.01 to 20 parts, particularly 0.1 to 10 parts by weight relative to 100 parts by weight of the acrylamide polymer. We have found that when this total quantity is less than 0.01 part by weight, the stabilizing effectiveness is low. On the other hand when this total quantity exceeds 20 parts by weight, almost no improvement due to the use of these compounds is discernable, whereby the use of these compounds in such large quantities is uneconomical.

2. Aqueous Solution of Acrylamide Polymer

The acrylamide polymers with which this invention is concerned is a homopolymer of acrylamide, acrylamide copolymers containing a predominant quantity of the acrylamide component, and mixtures thereof.

Examples of comonomers in the case of a copolymer are methacrylamide, (meth)acrylic acid and salts thereof, (meth)acrylonitrile, 2-acrylamide-2-methylpropanesulfonic acid and salts thereof, dimethylaminoethyl (meth)acrylate, lower alkyl acrylates, vinylpyridine, and other hydrophilic monomers.

The term "(meth)acryl-" as used herein is intended to include acryl- and methacryl-. The term "copolymer" as used herein is intended to include, in addition to copolymers obtained from a copolymerization reaction starting with the constituent comonomers, those obtained by modifying polymers thereby to render them compositionally into copolymers. Examples of the latter class of copolymers are those in which a part (for example, 50 mol percent or less) of the amide group of a homocopolymer of acrylamide is converted into another functional group by a reaction such as hydrolysis, methylolation or conversion into a Mannich base.

While there are no definite requirements for the molecular weights of these polymers, they are ordinarily made relatively large in view of their use and also so that maximum effectiveness due to this invention will be exhibited. More specifically, the molecular weight of each of these polymers is, for example, at least 500,000 (as measured by the light-scattering method).

The water for producing aqueous solutions of polymers of this character may be, in addition to city (tap) water, water for industrial use, and water from rivers and streams, water having various soluble materials dissolved in it. (It will be obvious, of course, that the kind and quantity of such materials dissolved must not be such as to give rise to separation of the acrylamide polymer). Examples of such kinds of water are salty water such as ocean water or brackish water.

While the concentration of an aqueous solution of an acrylamide polymer to be stabilized according to this invention varies with the molecular weight of the polymer, it is ordinarily of the order of approximately 0.0001 to approximately 30 percent by weight, particularly approximately 0.0001 to approximately 5 percent by weight, in the case of a polymer of a molecular weight of 500,000 or more.

3. Stabilization

The stabilization of an aqueous solution of an acrylamide polymer or the preparation of a stabilized aqueous solution of the polymer can be carried out by any of various modes suitable for causing the stabilizing agent of this invention to become existent in this aqueous polymer solution.

One such method comprises adding the compounds (A) and (B) of the stabilizer of this invention together or separately, directly as they are or in the form of a solution or a dispersion, to the aqueous polymer solution which may be in gel state in some cases depending on the molecular weight or concentration of the polymer. When this aqueous polymer solution is to be made by dissolving a solid polymer, the stabilizer compounds in powder state can be mixed with the solid polymer by means of a mixer, blender, or the like, or the stabilizer compounds can be dissolved in the water which is the solvent.

Another method of preparing a stabilized aqueous acrylamide polymer solution, as mentioned hereinbefore, is to cause the stabilizer compound (A) and/or the stabilizer compound (B) to be present in the process step of producing the acrylamide polymer, that is, the polymerization step. In this case, since the polymerization is ordinarily carried out in an aqueous solution, an aqueous acrylamide polymer solution containing at least one of the stabilizer compounds is obtained upon completion of the polymerization. Therefore, by adding the remaining other stabilizer compound at an appropriate time, a stabilized acrylamide polymer solution according to this invention is obtained.

The stabilization effectiveness according to this invention as described above can be obtained even when the temperature of the aqueous acrylamide polymer solution is 100° C.

In order to indicate more fully the nature and utility of this invention, the following specific examples of practice are set forth, it being understood that these examples are presented as illustrative only and are not intended to limit the scope of the invention.

4. Examples of Practice

Example 1 and Comparison Example 1

230 parts of acrylamide and 770 parts of deaerated ion-exchange water were placed in a 1.5-liter Dewar vessel. The pH value was adjusted to 8, and 0.5 part of azobisamidinopropane hydrochloride and 0.05 part of nitrilotrispropion amide were added. Polymerization was then started at 25° C.

As a result, a polymer in gel state having elasticity was obtained. Caustic soda was added to the elastic gel, and the mixture was kneaded thereby to cause 15 percent of the amide group to undergo hydrolysis. The resulting polymer material was cut into small square pieces, each measuring approximately 5 mm on a side, which were dried at 60° C. and thereafter crushed into particles measuring 2 mm or less. A portion of this particulate polymer was dissolved in deaerated ion-exchange water to form a 0.1 percent aqueous solution thereof. The solution viscosity of this solution was 150 cp. as measured at 25° C. with a Brookfield viscosimeter.

Separately, the dried polymer was dissolved in a 3-percent sodium chloride solution to form a 0.06-percent aqueous polymer solution. The viscosity of this solution was measured and designated as the initial viscosity (Ao). A portion of this aqueous solution was taken, and, to this solution, both the sodium salt of 2-mercaptobenzimidazole (MBI-Na) and the 3,5-ditertiarybutyl-4-hydroxybenzyl alcohol (DBH) in accordance with this invention were added. The resulting solution was treated in a glass ampule at 85° C., and thereafter its viscosity (A) was measured.

The variation with time was represented as viscosity loss percentage (Ao-A/Ao × 100).

For comparison, the tests were carried out respectively for the sodium salt of 2-mercaptobenzimidazole by itself and for 3,5-ditertiarybutyl-4-hydroxybenzyl alcohol by itself. The results are shown in Table 1.

TABLE 1

| No. | MBI—Na* Quantity added (%) | DBH* Quantity added (%) | Viscosity loss percentage (%) | | |
|---|---|---|---|---|---|
| | | | 10th day | 20th day | 30th day |
| Comparison Example 1 | | | | | |
| 1-1 | 0 | 0 | 39.6 | 46.6 | 50.5 |
| 1-2 | 0 | 2.5 | 30.4 | 37.3 | 43.1 |
| 1-3 | 2.5 | 0 | 10.4 | 15.1 | 18.8 |
| Example 1 | | | | | |
| 1-1 | 2.5 | 2.5 | 1.6 | 4.2 | 7.8 |
| 1-2 | 2.5 | 1.2 | 2.0 | 5.1 | 9.0 |
| 1-3 | 1.0 | 0.5 | 2.0 | 6.6 | 9.8 |

*Percent by weight relative to polymer (similarly as in the examples set forth hereinafter).

As indicated in Table 1, when MBI-Na and DBH are used in combination as additives of the aqueous polymer solution, these two compounds contribute synergistically to the stabilization of the viscosity of the aqueous polymer solution.

EXAMPLE 2

With the use of the partially hydrolyzed polyacrylamide obtained in Example 1, the procedure of Example 1 was carried out except for the use of 2,2'-methylenebis-(4-methyl-6-tertiarybutylphenol) (MBMP) instead of the 3,5-ditertiarybutyl-4-hydroxybenzyl alcohol (DBH) used in Example 1. The results are set forth in Table 2.

TABLE 2

| No. | MBI—Na Quantity added (%) | MBMP Quantity added (%) | Viscosity loss percentage (%) | | |
|---|---|---|---|---|---|
| | | | 10th day | 20th day | 30th day |
| 2-1 | 0 | 2.5 | 31.6 | 36.9 | 41.1 |
| 2-2 | 2.5 | 2.5 | 2.1 | 4.6 | 8.0 |
| 2-3 | 1.0 | 0.5 | 3.1 | 4.9 | 10.5 |

EXAMPLE 3

The procedure of Example 2 was carried out except for the use of 2,2'-methylenebis-(4-ethyl-6-tertiarybutylphenol) (MBEP) instead of the 2,2'-methylenebis-(4-methyl-6-tertiarybutylphenol) (MBMP) used in Example 2. The results are shown in Table 3.

TABLE 3

| No. | MBI—Na Quantity added (%) | MBEP Quantity added (%) | Viscosity loss percentage (%) | | |
|---|---|---|---|---|---|
| | | | 10th day | 20th day | 30th day |
| 3-1 | 0 | 2.5 | 30.3 | 37.1 | 42.3 |
| 3-2 | 2.5 | 2.5 | 1.5 | 3.9 | 7.6 |
| 3-3 | 1 | 2.5 | 2.6 | 4.6 | 9.1 |

EXAMPLE 4

The procedure of Example 3 was followed except for the use of 4,4'-butylidenebis-(3-methyl-6-tertiarybutylphenol) (BBMP) instead of the 2,2'-methylenebis-(4-ethyl-6-tertiarybutylphenol) (MBEP) used in Example 3. The results are shown in Table 4.

TABLE 4

| No. | MBI—Na Quantity added (%) | BBMP Quantity added (%) | Viscosity loss percentage (%) | | |
|---|---|---|---|---|---|
| | | | 10th day | 20th day | 30th day |
| 4-1 | 0 | 2.5 | 32.6 | 38.3 | 45.1 |
| 4-2 | 2.5 | 2.5 | 3.3 | 5.6 | 11.0 |
| 4-3 | 1.0 | 0.5 | 4.0 | 6.7 | 11.9 |

EXAMPLE 5

The procedure of Example 3 was followed except for the use of 3,5-ditertiarybutyl-4-hydroxybenzyl alcohol methylether (DBHM) instead of the 4,4'-butylidenebis-(3-methyl-6-tertiarybutylphenol) (BBMP) used in Example 4. The results are set forth in Table 5.

TABLE 5

| No. | MBI—Na Quantity added (%) | DBHM Quantity added (%) | Viscosity loss percentage (%) | | |
|---|---|---|---|---|---|
| | | | 10th day | 20th day | 30th day |
| 5-1 | 0 | 2.5 | 31.6 | 38.0 | 44.2 |
| 5-2 | 2.5 | 2.5 | 1.2 | 3.8 | 7.1 |
| 5-3 | 1.0 | 0.5 | 1.9 | 4.4 | 9.6 |

What we claim is:

1. A stabilized aqueous acrylamide polymer solution containing in combination a stabilizing quantity of a 2-mercaptobenzimidazole compound and a phenolic anti-oxidant compound.

2. A stabilized aqueous acrylamide polymer solution according to claim 1 in which the 2-mercaptobenzimidazole compound is a compound having the formula

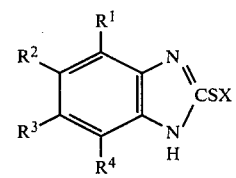

where each of $R^1$ through $R^4$ is a hydrogen atom or a lower alkyl group, and X is a hydrogen atom, an alkali metal or ammonium, or a tautomer thereof; and the phenolic antioxidant compound is a hindered phenolic antioxidant compound.

3. A stabilized aqueous acrylamide polymer solution according to claim 2 in which the 2-mercaptobenzimidazole compound is a member selected from the group consisting of 2-mercaptobenzimidazole, methyl-2-mercaptobenzimidazoles, and sodium salts thereof; and the phenolic antioxidant compound is a member selected from the group consisting of 2,2'-methylenebis-(4-methyl-6-tertiarybutylphenol), 2,2'-methylenebis-(4-ethyl-6-tertiarybutylphenol), 4,4'-butylidenebis-(3-methyl-6-tertiarybutyl phenol), 3,5-ditertiarybutyl-4-hydroxybenzyl alcohol, and 3,5-ditertiarybutyl-4-hydroxybenzyl alcohol methylether.

* * * * *